United States Patent
Beran et al.

(10) Patent No.: US 11,128,730 B2
(45) Date of Patent: *Sep. 21, 2021

(54) PREDICTIVE BITRATE SELECTION FOR 360 VIDEO STREAMING

(71) Applicant: Sony Interactive Entertainment Inc., Tokyo (JP)

(72) Inventors: Erik Beran, Belmont, CA (US); Todd Tokubo, Newark, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/749,225

(22) Filed: Jan. 22, 2020

(65) Prior Publication Data

US 2020/0162757 A1    May 21, 2020

Related U.S. Application Data

(63) Continuation of application No. 15/481,324, filed on Apr. 6, 2017, now Pat. No. 10,547,704.

(51) Int. Cl.
| | |
|---|---|
| *G06F 15/16* | (2006.01) |
| *H04L 29/08* | (2006.01) |
| *H04L 29/06* | (2006.01) |
| *H04N 19/597* | (2014.01) |
| *H04N 21/2343* | (2011.01) |

(Continued)

(52) U.S. Cl.
CPC ........ *H04L 67/2847* (2013.01); *H04L 65/601* (2013.01); *H04L 65/80* (2013.01); *H04L 67/42* (2013.01); *H04N 19/597* (2014.11); *H04N 21/23439* (2013.01); *H04N 21/6373* (2013.01); *H04N 21/816* (2013.01); *H04L 29/08072* (2013.01); *H04L 69/329* (2013.01)

(58) Field of Classification Search
CPC ..... H04L 67/42; H04L 67/2847; H04L 65/80; H04L 65/601; H04L 69/329; H04L 29/08072; H04N 19/597
See application file for complete search history.

(56) References Cited

U.S. PATENT DOCUMENTS

| | | | |
|---|---|---|---|
| 8,554,784 | B2 | 10/2013 | Nurminen et al. |
| 8,599,266 | B2 | 12/2013 | Trivedi et al. |

(Continued)

FOREIGN PATENT DOCUMENTS

JP    2016165105 A    9/2016

OTHER PUBLICATIONS

International Search Report and Written Opinion dated Jun. 11, 2018 for International Patent Application No. PCT/US18/22259.

(Continued)

*Primary Examiner* — Khanh Q Dinh
(74) *Attorney, Agent, or Firm* — JDI Patent; Joshua Isenberg; Robert Pullman (57) ABSTRACT

Predictive pre-fetching of streams for 360 degree video is described. User view orientation metadata is obtained for a 360 degree video stream that includes data for a plurality of viewports. Data corresponding to one or more high-resolution frames for a particular one of the viewports is pre-fetched based on the user view orientation metadata and those frames are displayed. The high resolution frames are characterized by a higher resolution than for remaining viewports.

16 Claims, 6 Drawing Sheets

(51) Int. Cl.
*H04N 21/6373* (2011.01)
*H04N 21/81* (2011.01)

(56) References Cited

U.S. PATENT DOCUMENTS

| | | | |
|---|---|---|---|
| 8,953,022 B2 | 2/2015 | Mcardle et al. | |
| 9,313,424 B2* | 4/2016 | Yokogawa | H01L 27/14625 |
| 10,257,494 B2* | 4/2019 | Sadi | H04N 13/117 |
| 10,313,656 B2* | 6/2019 | Sadi | H04N 5/23229 |
| 10,356,022 B2* | 7/2019 | Joyce | H04N 21/854 |
| 10,388,075 B2 | 8/2019 | Schmirler et al. | |
| 10,455,721 B2* | 10/2019 | Miura | H05K 5/0013 |
| 10,462,466 B2* | 10/2019 | Abbas | H04N 19/137 |
| 10,476,922 B2* | 11/2019 | Edwards | H04L 65/602 |
| 10,484,621 B2* | 11/2019 | Adsumilli | H04N 19/167 |
| 10,547,704 B2* | 1/2020 | Beran | H04N 21/21805 |
| 10,547,825 B2* | 1/2020 | Sadi | H04N 13/254 |
| 10,602,191 B2* | 3/2020 | Abbas | H04N 19/86 |
| 10,645,362 B2* | 5/2020 | Abbas | H04N 13/111 |
| 10,645,369 B2* | 5/2020 | Gronholm | H04N 13/296 |
| 10,750,153 B2* | 8/2020 | Sadi | H04N 13/111 |
| 10,873,614 B2* | 12/2020 | Kolan | G06F 9/5072 |
| 2005/0128286 A1 | 6/2005 | Richards | |
| 2006/0187305 A1 | 8/2006 | Trivedi et al. | |
| 2010/0032348 A1 | 2/2010 | Duyvesteyn et al. | |
| 2010/0302348 A1 | 12/2010 | Richards | |
| 2011/0103199 A1 | 5/2011 | Winkler et al. | |
| 2012/0059826 A1 | 3/2012 | Mate et al. | |
| 2015/0015789 A1 | 1/2015 | Guntur et al. | |
| 2015/0124048 A1 | 5/2015 | King | |
| 2016/0088282 A1* | 3/2016 | Sadi | H04N 13/243 348/38 |
| 2016/0217760 A1* | 7/2016 | Chu | H04N 13/279 |
| 2017/0045941 A1 | 2/2017 | Tokubo et al. | |
| 2017/0054800 A1 | 2/2017 | DiVincenzo et al. | |
| 2017/0084073 A1 | 3/2017 | Pio et al. | |
| 2017/0084086 A1 | 3/2017 | Pio et al. | |
| 2017/0103577 A1 | 4/2017 | Mendhekar et al. | |
| 2017/0180435 A1* | 6/2017 | Edwards | H04L 65/4076 |
| 2017/0201478 A1* | 7/2017 | Joyce | H04L 67/42 |
| 2018/0295205 A1 | 10/2018 | Beran et al. | |
| 2020/0137462 A1* | 4/2020 | He | H04N 21/4728 |

OTHER PUBLICATIONS

Non-Final Office Action for U.S. Appl. No. 15/481,324, dated Dec. 14, 2018.
Notice of Allowance for U.S. Appl. No. 15/481,324, dated Apr. 10, 2019.
Notice of Allowance for U.S. Appl. No. 15/481,324, dated Sep. 19, 2019.
Extended European Search Report dated Nov. 24, 2020 for application No. EP18781769.7.
Non-final Notification of Reasons for Refusal dated Sep. 8, 2020 for Japanese Patent Application No. 2019-541128.
Office Action dated Sep. 3, 2020 for Chinese Patent Application No. 201880016424.3.
Y-K Wang (Qualcomm): "OMAF: On regional metadata signalling", 118. MPEG Meeting; 20170403-20170407; Hobart; (Motion Picture Expert Group or ISO/IEC JTCI/SC29/WGII), No. m40297 Mar. 25, 2017 (Mar. 25, 2017), XP030068642,Retrieved from the Internet : URL:http://phenix.int-evry.fr/mpeg/doc_end_user/documents/ll8_Hobart/wgll/m40297-vl-m40297.zip 11140297 regional metadata. docx [retrieved on Mar. 25, 2017].

* cited by examiner

FIG. 6

PREDICTIVE BITRATE SELECTION FOR 360 VIDEO STREAMING

CLAIM OF PRIORITY

This application is a continuation of U.S. patent application Ser. No. 15/481,324, filed Apr. 6, 2017, the entire contents of which are incorporated herein by reference.

FIELD OF THE INVENTION

Aspects of the present disclosure are related to video streaming. In particular, the present disclosure is related to streaming of 360 degree video.

BACKGROUND OF THE INVENTION 360 degree video is created by taking video streams from several cameras arranged around a single point and stitching the video streams together to create a single continuous video image. Modern encoders break the continuous video image in to multiple video streams of frames. To watch 360 degree video over a network, a server sends a client these multiple streams of frames. The client decodes and reassembles the streams into continuous images that are presented on a display.

A system may send a single request for frames, download the requested frames and then assemble them for display. This combination of actions is sometimes called a fetch action. Generally to reliably stream video without interruption a client must also pre-fetch video which means the system must download frames and process them before prior downloaded frames have been displayed. In this way the system builds a buffer of processed frames between the processed frames that are being displayed and subsequent frames that need to be downloaded and processed.

Buffering can be very costly on system resources especially when processing and storing high resolution video. To save bandwidth and reduce the amount of buffering required a client may request only a high resolution video stream frames that are within the field of view of the client also known as the viewport. In this case the client receives low resolution video streams for all but the current view of the client. A problem with this system is that a client is often able to move the field of view faster than a high quality stream can be requested, delivered and buffered. Thus, there is a need in the art, for a system that allows the client to predict where the field of view might be pointed in a 360 degree video stream and fetch the corresponding high resolution video stream before the field of view has moved.

BRIEF DESCRIPTION OF THE DRAWINGS

The teachings of the present disclosure can be readily understood by considering the following detailed description in conjunction with the accompanying drawings, in which.

SUMMARY OF THE INVENTION

The disadvantages associated with the prior art are overcome by aspects of the present disclosure relating to a method for pre-fetching 360 degree video comprising, obtaining a user view orientation metadata for a 360 degree video stream, pre-fetching frames determined by the user view orientation metadata, and displaying a higher resolution frame of the 360 degree video stream according to the user view orientation metadata.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Typically streaming 360 degree video over a network involves receiving a set of video streams of all one quality. Newer streaming techniques allow the reduction in bandwidth usage by only loading high quality streams in the area the viewer is focused. This technique has the additional effect of allowing the viewer to load higher resolution video streams without requiring as much time or buffer resources.

While the disclosed technique allows a viewer to watch higher quality video streams, a jarring drop in resolution may be experienced if the user suddenly moves the viewport away from the high quality stream. Aspects of the present disclosure have been developed to eliminate this jarring experience.

In other instances an author of a 360 degree video may have some artist vision as to what the viewer should see in a certain scene of a 360 degree video. According to prior art methods such details in a scene displayed to a viewer might be lost due to display of low resolution videos or while the view looks in another direction. As such aspects of present disclosure have been developed to improve perceived 360 degree video stream quality and to allow authors to define a viewport and video quality for a viewer.

Author Initiated Pre-Fetching

Figure 1:
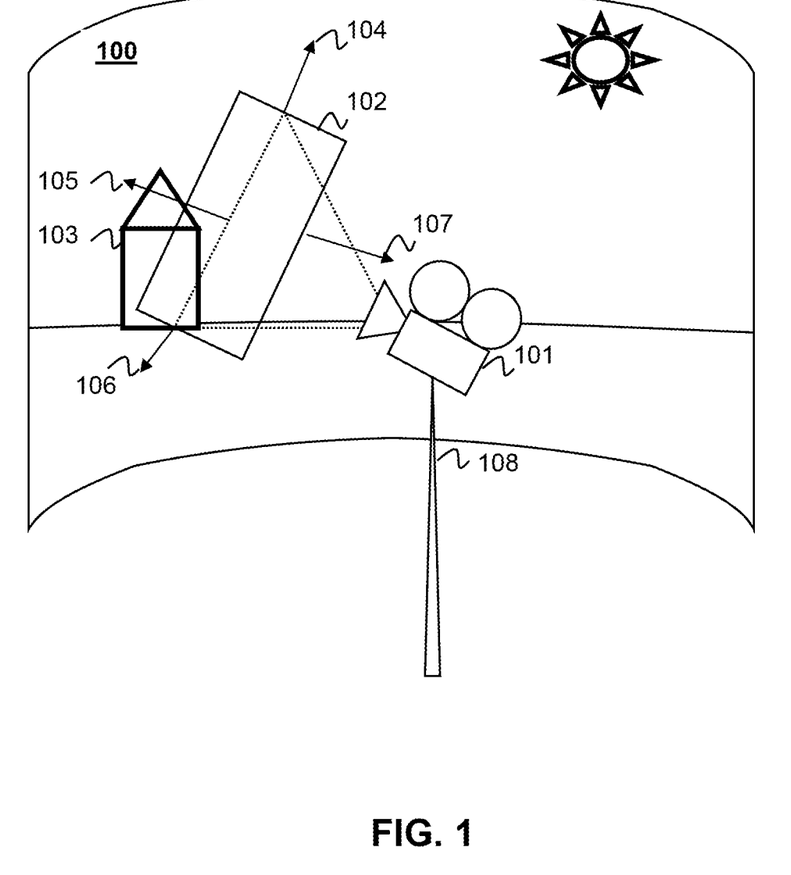
FIG. 1 is a diagram of a virtual camera field of view in a 360 degree video according to an aspect of the present disclosure.
Figure 2:
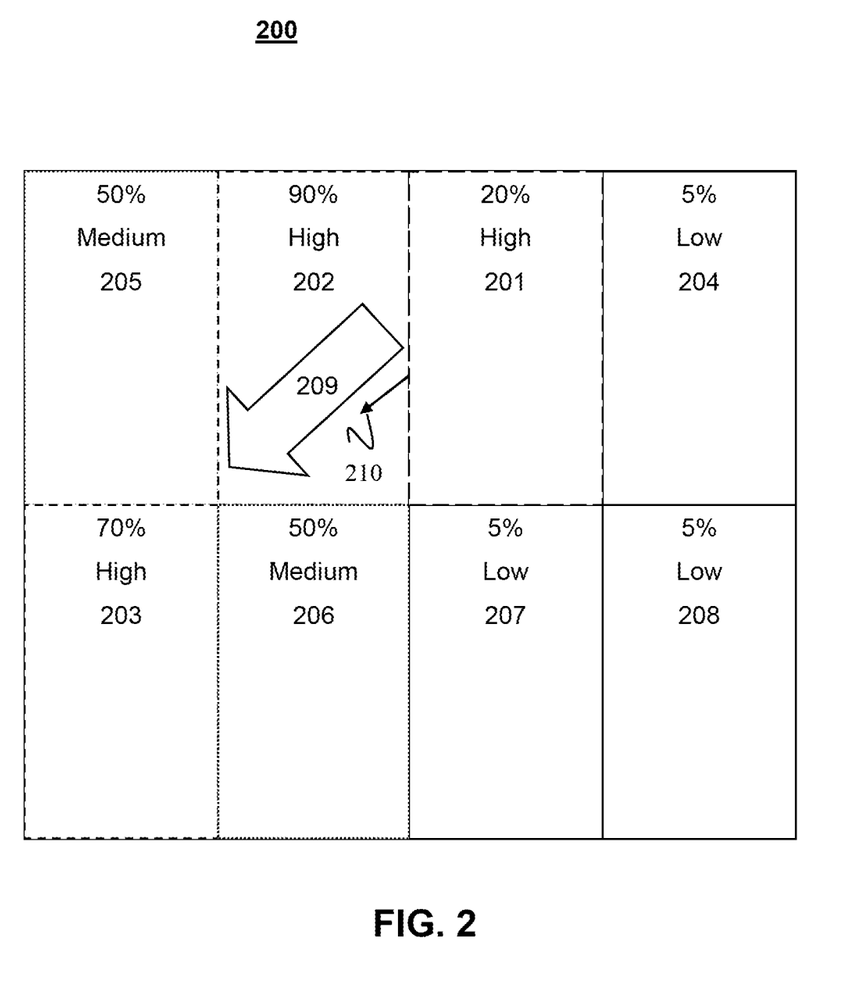
FIG. 2 is a diagram of predictive video fetching in an equirectangular projection according to an aspect of the present disclosure.

Within 360 degree video there may be many orientations that camera can take to view the image as can be seen in FIG. 1. The Camera 101 is fixed at a point 108 and the scene 100 is wrapped around the camera 101 to create a 360 degree viewable area. The Camera may rotate around the fixation point 108 to view images 103 in the scene. The scene may be broken up into different areas called viewports 102. Each viewport 102 may be a different video stream loaded by the client. As seen in FIG. 2 each section of the video may be divided in to these viewports. The camera 101 may change orientation in any direction, e.g., up 104, down 106, left 105, or right 107, to shift from one viewport 102 to another.

FIG. 2 depicts an equirectangular projection according to aspects of the current disclosure. The 360 degree scene 200 is composed of a series of equally sized rectangles 201-208. Each rectangle may be separate video stream that the client device loads and stitches together for display. Each rectangle may be large enough to encompass the view of the camera in which case they are a viewport 201. Alternatively several rectangles may together represent a single viewport (Not shown).

Authors of video and images typically have some idea of what they want the viewer of the content to see. Creators of 360 degree video are no different. As discussed above, 360 degree video displayed in the prior art was only one resolution. At lower resolutions important aspects of a video image might be lost to a viewer.

According to aspects of the present disclosure an Author may define the location of a high resolution frame for the client to load 202. The Author may also define a metadata 209 within the video streams which the client can use to predictively to load high resolution video content for streams that correspond to portions of 360 degree video the user is likely to view. By way of example, and not by way of limitation, the metadata 209 may be in the form of a vector having both a magnitude, representing the significance, and a direction. In some implementation, time may be encoded beside the metadata 209 or the vector could be placed in a stream of fixed time-step intervals. The defined also be referred to as user view orientation metadata.

In some implementations, the metadata may be generated on a backend or server-side with no explicit sending of view orientation information by the client. By way of example and not by way of limitation, a server may build a probability field based on which streams the client requests and when, then mapping which stream belongs to which viewport. This assumes the client will select the highest quality streams for the current client viewport.

The metadata 209 may be associated with a potential for a movement of the viewport 201 within the video streams by a user. Alternatively metadata 209 in the form of an Author defined pre-fetch vector may be an idealized movement vector for the viewer according to the Author's artistic vision. The client device may track both the actual movement of the viewport 210 and the metadata 209. The client device may pre-fetch frames in the actual view port 201 and frames along the Author defined prefetching vector 202, 203. Alternatively the client may only fetch high resolution frames 202, 203 along an Author defined vector to encourage the viewer to move the viewport to a different location in the 360 degree stream.

The Author-defined prefetching metadata need not be a vector. The Author may simply define frames they desire to be in high resolution during certain times of display 202. Thus the client may fetch the Author defined high resolution frames at certain times as defined by the author.

An author may also define a certain area of a frame as high-resolution for a zoom function. The Author may provide level of detail information for a subsection of the frame such that a certain subsection of a frame is encoded as high resolution. Metadata informing the client of the location of this high resolution subsection could be sent to the client so that it may pre-fetch that stream.

The metadata 209, may also be used to control viewport 201, during display of video. The Author may choose to have the Viewport 201 move along the metadata 209 without viewer input. In this way virtual cameraman functionality can be achieved and the Author can better display the artistic vision in a 360 degree display.

Production Defined Pre-Fetching

During the addition of effects to the frames of a video stream, also known as Production, it may be desirable for the client to pre-fetch high resolution frames to match production effects. For example and without limitation, it may be desirable for the client to pre-fetch high resolution frames in the apparent direction of a loud sound. Alternatively during production it may be desirable for the client to pre-fetch frames in location where there is a lot of special effects or special camera movement.

According to aspects of the present disclosure the client may receive metadata that causes the client to pre-fetch certain frames as defined during production. These defined frames may correspond more to special effects and sound cues than artistic vision as discussed above. The Production defined pre-fetch metadata may also be referred to as user orientation metadata.

Predictive Prefetching

Figure 3:
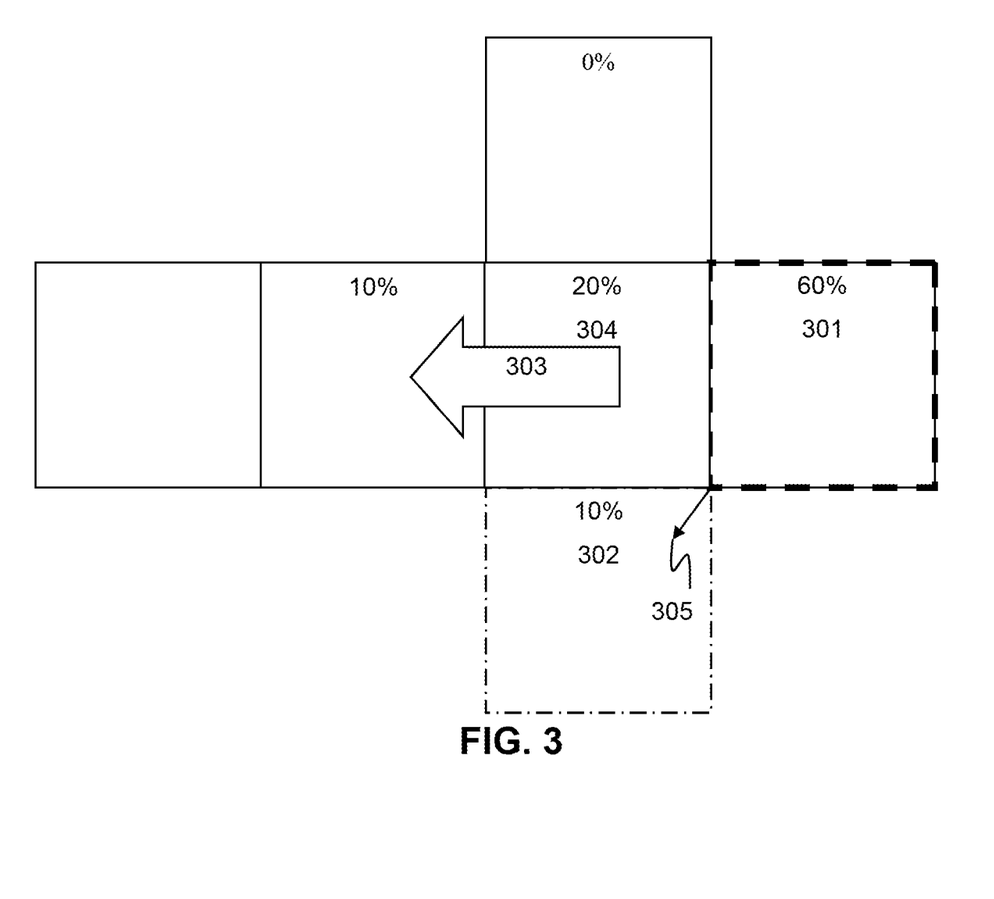
FIG. 3 is a diagram of predictive video fetching in a cube mapped projection according to an aspect of the present disclosure.

According to alternate aspects of the disclosure a client may use predictive metadata to pre-fetch streams determined to be in the potential future viewport as seen in FIGS. 2 and 3. The predictive metadata may be generated during production to ensure that the end viewer receives higher resolution frames in their field of view than they would in a system employing a single resolution stream.

A studio may use screening data collected from viewers of a 360 degree video to generate a probabilistic model of where a viewer may be looking in the video at any time. This probabilistic model may define a user's likelihood to move from the current frame 201 to another 202 or stay in the current frame 201 based on such variables as, current view orientation in the 360 degree video, time code within video, past views of the video and the like. The probability of changing frames to may be represented by probabilities tied to each frame in the 360 degree video currently displayed, this is represented by the percentages in each frame 201-208 seen in FIG. 2. Predictive prefetching data may be referred to as user orientation metadata.

Alternatively the predictive prefetching metadata may be negative or inverse/opposite data. In other words, instead of a probability of where a user is likely to look, the prefetching metadata may instead represent one or more probabilities of where the viewer is not likely to look.

The pre-fetching of video frames is not limited to high and low resolution streams. As seen in FIG. 2, the system may select to pre-fetch intermediate resolutions for frames that have a certain threshold level of probability 205, 206. Likewise frames that have low probability of being a viewport 204, 207, 208 will only be pre-fetched with display low resolution images. As an additional aspect low viewport probability frames 204, 207, 208 may receive fewer updates than higher probability frames by way of example and not by way of limitation, a low probability frame may only update, e.g., once every 2 updates of high probability streams. More generally, any factor of the optimal/high probability streams may be used for updating low-probability streams depending on whether they are in-view or not. In some implementations a low-probability stream that is still in view may be updated at the full high probability update rate to avoid noticeable desynchronization between the stitched frames.

To determine whether to pre-fetch a stream using this probabilistic metadata, the client may have a defined threshold probability level. When the probabilistic metadata determines that the probability a viewer will move the viewport into a certain frame exceeds the threshold probability level;

the client will pre-fetch that frame. In an alternate embodiment the client may pre-fetch frames based on the fidelity of probabilistic metadata.

Predictive Fidelity Checking

FIG. 3 depicts a cube mapped projection according to aspects of the present disclosure. The predictive data, represented as percentages in each frame mis-matches the actual movement 305 of the viewport 301. In this example, author predicted pre-fetch vector 303 also does not match an actual movement vector 305 of the viewport 301. In the case presented in FIG. 3, the actual viewport would end up at 302 while the system would pre-fetch either frame 301 based on prediction data or 304 based on the author defined pre-fetch vector. Thus in the case of FIG. 3 the system may to determine whether to continue to follow the viewer orientation metadata or default to a single quality level.

The client may perform continuous or intermittent checking of the fidelity of the probabilistic and Author defined metadata. The client may initially pre-fetch high resolution frames based on probabilistic metadata and the actual orientation of the viewport 301. The client may then display high resolution frames in accordance with the orientation of the viewport and the metadata. The client may check to determine whether the viewer has moved the viewport to the high resolution frame in accordance with the probabilistic or author defined metadata.

Upon a determination that the viewport is not within the frame pre-fetched according to the probabilistic metadata or author defined pre-fetch vectors, the client may cease to use the metadata for pre-fetching and only fetch high resolution frames in the current field of view of the viewport. In an alternate embodiment the client may continuously check the viewport movement with the metadata for a correlation. The client may have a tolerance level for viewport movements that do not follow the probabilistic metadata. This tolerance level may for example but not by limitation be, a ratio of predicted frames missed over predicted frames viewed, in that instance as the ratio grows to 1 the client may shift to fetching only frames within the actual viewport. More generally, the tolerance level may be determined by statistically quantifying the amount of variation in a set of values. Any suitable measure of variability, e.g., standard deviation may be applied over a fixed or sliding window set of user and meta data.

Post-Production Pre-Fetch Generation

Another aspect of the present disclosure is the generation of predictive metadata based on end-viewer data. The client device may collect data from the viewer as to the orientation of the viewport. The client device may use this viewer data to generate predictive data and pre-fetch a video stream according the predictive data. The client device may also share the predictive data with other clients or a server to generate or refine probabilistic metadata for the video stream.

The client device may use viewport orientation data to generate predictive data. For example and not by way of limitation the client device may use a movement vector 305 of the viewport to predictively fetch high resolution video streams lying on the vector and taking into account movement speed. User generated predictive prefetching data may be referred to as user orientation metadata.

The client may send the viewport orientation data to a data collection center to generate better probabilistic metadata for future viewing. The data collection center may use the viewport orientation data in addition to the Author defined pre-fetching data to generate metadata for the video stream. The generated metadata may weight the Author defined prefetching data such that prefetching of author defined streams are preferred unless the client is following a past user defined viewing vector closely.

Server-Side Prefetching

In an alternate embodiment of the present disclosure the server uses the metadata to select high resolution streams to send to the client device. According to aspects of the present embodiment the metadata used by the server may be author defined, probabilistic data generated from viewer, or other predictive data. The server may receive a request for a 360 degree video stream from a client device. The server may the check for viewer orientation metadata for the requested stream. Upon finding such metadata, the server may send high resolution streams to the client according to the metadata. The server may also receive actual viewer orientation data and send high resolution streams in view of the actual viewport. Furthermore the server may perform predictive fidelity checking as discussed above to determine whether it should continue to send high resolution video streams based on the metadata.

Implementation

Figure 4:
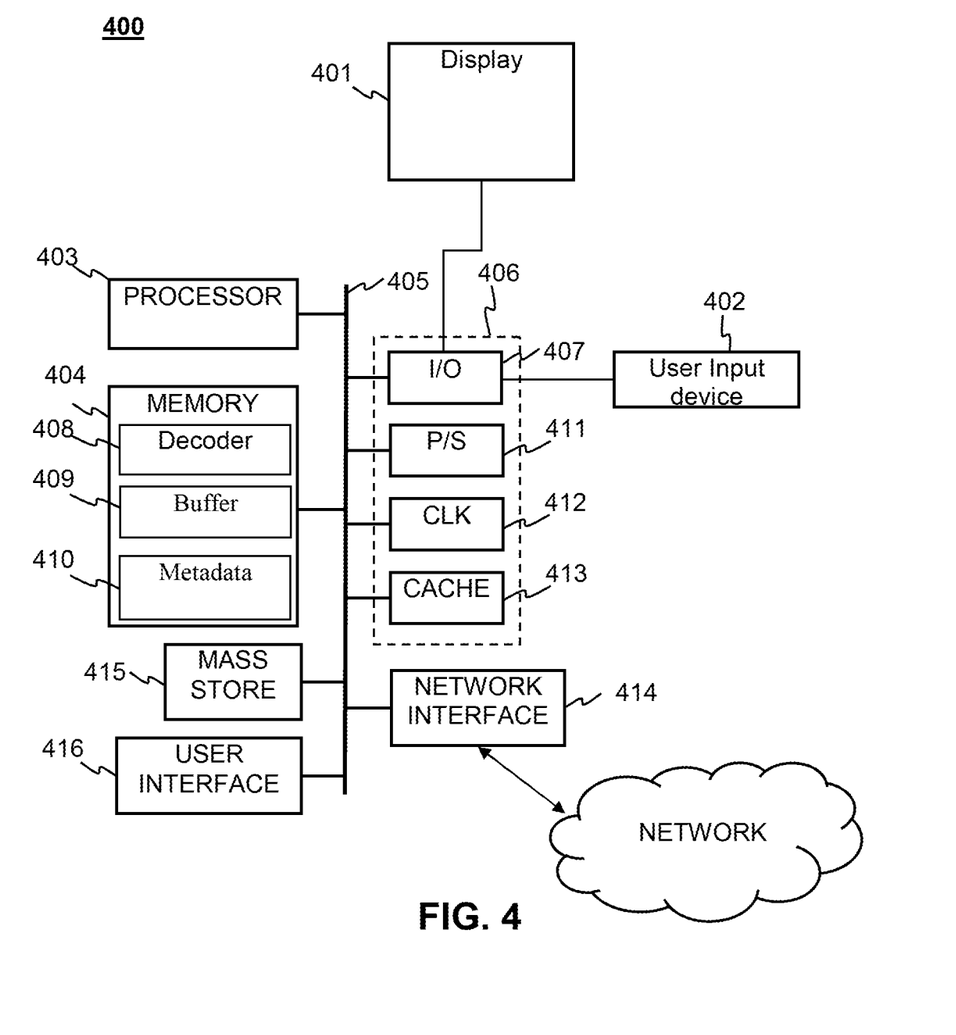
FIG. 4 is a block diagram of a system for displaying 360 degree video according to an aspect of the present disclosure.

FIG. 4 depicts a system according to aspects of the present disclosure. The system may include a computing device 400 coupled to a display 401 and a user input device 402. The display device 401 may be in the form of a cathode ray tube (CRT), flat panel screen, touch screen, or other device that displays text, numerals, graphical symbols, or other visual objects. The user input device 402 may be a controller, touch screen or other device that allows the user to interact with a user view orientation and select 360 degree video streams. In some implementations, the display 401 may be a 360 degree display configured to display multiple viewports of 360 degree video simultaneously for an immersive 360 degree video experience. In other implementations, the display 401 may be a conventional two-dimensional display. In such implementations, a user may be able to determine the viewport by interaction with the computing device.

The computing device 400 may include one or more processor units 403, which may be configured according to well-known architectures, such as, e.g., single-core, dual-core, quad-core, multi-core, processor-coprocessor, cell processor, and the like. The computing device may also include one or more memory units 404 (e.g., random access memory (RAM), dynamic random access memory (DRAM), read-only memory (ROM), and the like).

The processor unit 403 may execute one or more programs, portions of which may be stored in the memory 404 and the processor 403 may be operatively coupled to the memory, e.g., by accessing the memory via a data bus 405. The programs may be configured to request a frames for a video stream based on metadata received 410 for that video stream. The programs when executed by the processor may cause the system to decode high-resolution frames 408 and store frames potentially in the viewport of the viewer in a buffer 409.

The computing device 400 may also include well-known support circuits, such as input/output (I/O) 407, circuits, power supplies (P/S) 411, a clock (CLK) 412, and cache 413, which may communicate with other components of the system, e.g., via the bus 405. The computing device may include a network interface 414. The processor unit 403 and network interface 414 may be configured to implement a local area network (LAN) or personal area network (PAN), via a suitable network protocol, e.g., Bluetooth, for a PAN. The computing device may optionally include a mass storage device 415 such as a disk drive, CD-ROM drive, tape drive, flash memory, or the like, and the mass storage device may store programs and/or data. The computing device may also include a user interface 416 to facilitate interaction between the system and a user. The user interface may include a keyboard, mouse, light pen, game control pad, touch interface, or other device. In some implementations, the user may use the interface 416 to change the viewport, e.g., by scrolling with a mouse or manipulation of a joystick. In some implementations the display 401 may be a hand-held display, as in a smart phone, tablet computer, or portable game device. In such implementations, user interface 416 may include an accelerometer that is part of the display 401. In such implementations, the processor 403 can be configured, e.g., through suitable programming, to detect changes in the orientation of the display and use this information to determine the viewport. The user can therefore change the viewport simply by moving the display.

Figure 5:
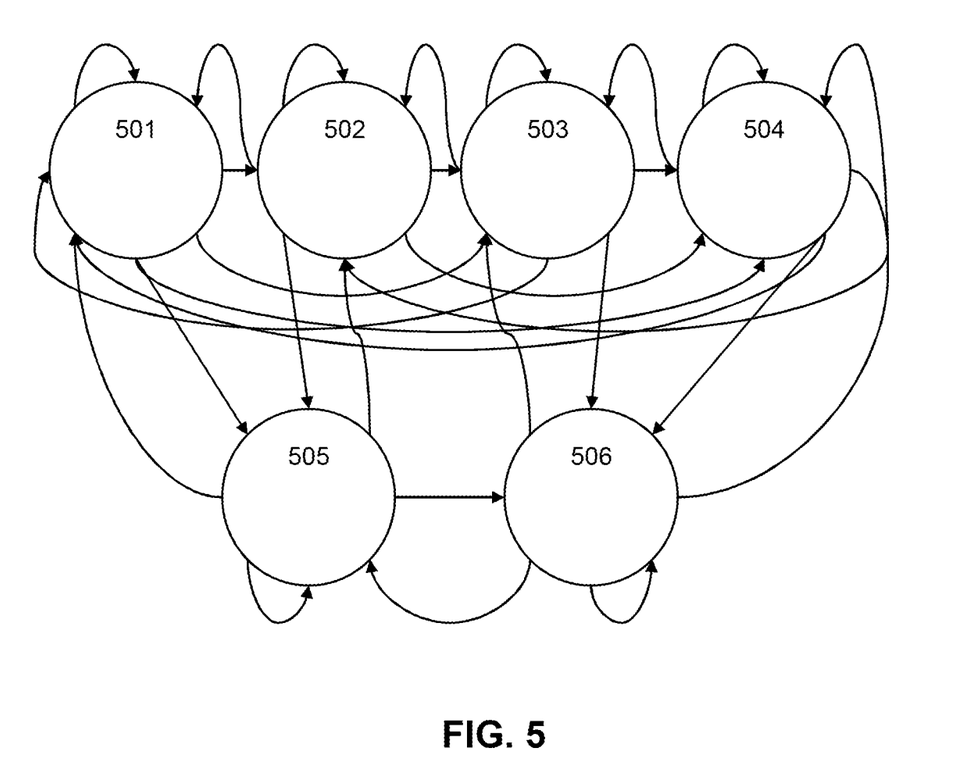
FIG. 5 is a simplified circle diagram of a Markov chain for deciding when to change frames according to an aspect of the present invention.

In some implementations, the predictive metadata may be configured to implement a Markov chain. FIG. 5 shows a graphical representation of a Markov chain according to aspects of the current disclosure. Each circle represents a state 501-506, e.g., a viewport orientation in the 360 degree video. There are six states in this Markov chain representing a cube mapped video stream. Each arrow represents the probability that the viewport will change to another one of the viewports of the video stream. These transfer probabilities could be set by hand by the director or producer, determined from focus group data or from actual viewer data. Each frame may have its own Markov probabilities at each time point in the video stream. According to one embodiment of the present disclosure the system may only receive metadata representing the Markov probabilities for a transition from the current viewport orientation to a different orientation, e.g., a client displaying a current viewport at 501 would only receive the probability of moving from the current viewport 501 to a different one of a plurality of viewports 502-506 or staying in current viewport 501. In this way the system could reduce initial load times and bandwidth usage by only receiving probabilities of transition from the current state while receiving the stream. Alternatively the system may receive an overall Markov probability model for the video stream at each time point at the start of the video stream. This embodiment increases the initial load time for the stream but reduce the overall information that needs to be processed during streaming. In another embodiment the system may receive Markov probability models at each time point while streaming the 360 degree video. This embodiment decreases upfront load times at the cost of stream processing but also includes additional Markov probability data in case of a desynch between the client and the server.

To implement author defined pre-fetch metadata as described above with the Markov chain model the system may weight the probability of transition to states lying along an Author defined pre-fetch vector. Thus if the probability of movement plus the weight surpasses a threshold then the client will initiate prefetching of that state.

Figure 6:
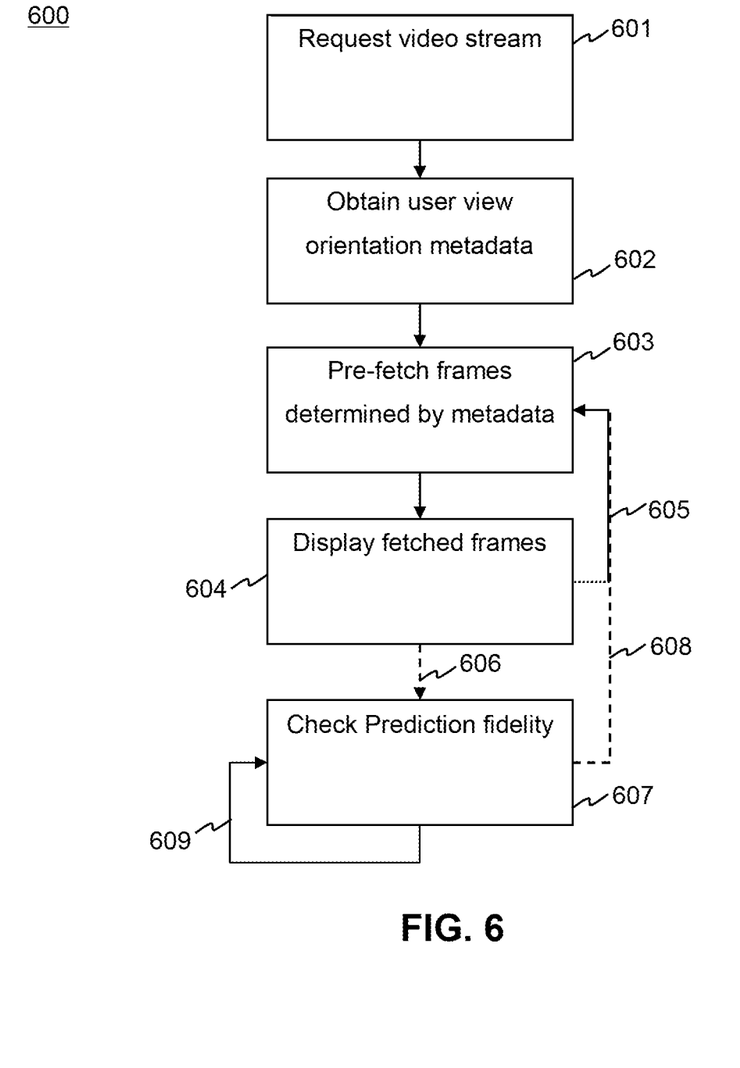
FIG. 6 is a flow diagram illustrating a method of displaying 360 video according to aspects of the present disclosure.

According to aspects of the present disclosure the client may receive the viewer orientation metadata for a requested video stream independently of the video stream. If the metadata is received independently of the video stream it must be time-synched to the stream. In alternate aspects of the current disclosure the metadata may be received as part the video stream itself, by way of example and not by way of limitation, in the header of the 360 degree video stream FIG. 6 depicts a flow diagram for predictive bit rate selection according to aspects of the present disclosure. The system may request a video stream 601 from the network.

Upon request of the video stream the system may obtain user view orientation metadata 602 from the network or stored locally in mass store memory 415 or from storage media such as a compact disk or from any suitable type of data storage known in the art. It should be noted that as discussed above user view orientation metadata may also be obtained during streaming. The viewer orientation metadata may inform the system of frames to fetch before display including potential viewports that have the user has not yet entered as discussed above. Thus the system will pre-fetch the frames that are potential viewports or desired viewports as well as the initial starting viewport frames in higher resolution and the rest of the frames in the 360 degree video stream in lower resolution 603 as discussed above. The system will then display the pre-fetched frames 604 through for example a display device 401 as discussed above. While displaying pre-fetched frames 604 the system may continue 605 pre-fetching frames 603 to create an uninterrupted 360 degree video streaming experience with higher resolution frames in the user's field of view. Optionally the system may use 606 prediction fidelity checking 607 to determine whether to continue pre-fetching frames according to view orientation metadata 608 or to enter a present load state in which only frames in the current viewport are pre-fetched in a higher resolution. In the present load state the system may continue to check the fidelity of prediction 609 until the predictions become accurate as discussed above. At which point the system may resume prefetching 608 based on user view orientation metadata 603.

While the above is a complete description of the preferred embodiments of the present invention, it is possible to use various alternatives, modifications, and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for". Any element in a claim that does not explicitly state "means for" performing a specified function, is not to be interpreted as a "means" or "step" clause as specified in 35 USC § 112, ¶ 6.

What is claimed is:

1. A method comprising:
   a) obtaining view orientation metadata for a 360 degree video stream that includes data for a plurality of viewports;
   b) pre-fetching data corresponding to one or more high-resolution frames for a particular viewport of the plurality of viewports determined by the user view orientation metadata,
      wherein the view orientation metadata is related to a predictive probability,
      wherein said pre-fetching frames includes applying a first threshold to the predictive probability to determine the particular viewport of the plurality of viewports; and
   c) displaying the one or more high-resolution frames, wherein the one or more high resolution frames are characterized by a higher resolution than for remaining viewports of the plurality of viewports.

2. The method of claim 1 wherein the user view orientation metadata is an Author-defined pre-fetch vector.

3. The method of claim 1 wherein the user view orientation metadata is a pre-fetch vector created to match production effects in a scene of the 360 degree video stream.

4. The method of claim 1 wherein the predictive probability is generated by a focus group.

5. The method of claim 1 wherein the predictive probability is generated using user generated frame location data.

6. The method of claim 1 wherein the predictive probability also includes an Author defined pre-fetch vector.

7. The method of claim 6 wherein the Author defined pre-fetch vector is a weight applied to the probability of a viewport frame change.

8. The method of claim 1 wherein the predictive probability of a viewport frame change is a probability for a Markov model.

9. The method of claim 1 wherein the user view orientation metadata is a movement vector.

10. The method of claim 1 wherein b) includes prefetching intermediate resolution frames when the predictive probability exceeds a second threshold.

11. The method of claim 1, wherein the user view orientation metadata represents a probability of where a user is likely to look.

12. The method of claim 1, wherein the user view orientation metadata represents a probability of where a user is not likely to look.

13. The method of claim 1 wherein prefetching data corresponding to one or more high-resolution frames determined by the user view orientation metadata includes prefetching a frame that has a higher resolution section that the rest of the frame.

14. A non-transient computer readable medium containing program instructions for causing a computer to perform the method of:

a) obtaining a user view orientation metadata for a 360 degree video stream that includes data for a plurality of viewports;

b) pre-fetching data corresponding to one or more high-resolution frames for a particular viewport of the plurality of viewports determined by the user view orientation metadata
wherein the view orientation metadata is related to a predictive probability,
wherein said pre-fetching frames includes applying a first threshold to the predictive probability to determine the particular viewport of the plurality of viewports.

15. A system, comprising:

a processor;

a display coupled to the processor;

a memory coupled to the processor having processor-executable instructions embodied therein, the instructions being configured to implement a method upon execution by the processor, the method comprising:

a) obtaining a user view orientation metadata for a 360 degree video stream that includes data for a plurality of viewports;

b) pre-fetching data corresponding to one or more high-resolution frames for a particular viewport of the plurality of viewports determined by the user view orientation metadata
wherein the view orientation metadata is related to a predictive probability,
wherein said pre-fetching frames includes applying a first threshold to the predictive probability to determine the particular viewport of the plurality of viewports.

16. The system of claim 15 wherein the display is a 360 degree display configured to display the plurality of viewports simultaneously.

* * * * *